United States Patent

Smith

[11] Patent Number: 5,755,180
[45] Date of Patent: May 26, 1998

[54] CARRYING CASE FOR PET ACCESSORIES

[76] Inventor: Judy Smith, P.O. Box 1784, Middleburg, Va. 22117

[21] Appl. No.: 613,049

[22] Filed: Mar. 8, 1996

[51] Int. Cl.[6] .................................................. A01K 1/035
[52] U.S. Cl. ........................... 119/72; 119/496; 119/165; 40/725; 40/312
[58] Field of Search ........................... 119/61, 165, 496, 119/497, 72; 190/19, 24, 21, 109, 110; 206/745, 769; 40/312, 725

[56] References Cited

U.S. PATENT DOCUMENTS

| | | | |
|---|---|---|---|
| D. 100,473 | 7/1936 | Hershfield | D30/109 |
| D. 129,108 | 8/1941 | Sprague | D30/109 |
| D. 143,491 | 1/1946 | Hopkins | D33/19 |
| D. 158,458 | 5/1950 | Gullstrand | 40/725 |
| D. 202,160 | 8/1965 | Territo | D87/5 |
| D. 211,526 | 6/1968 | Ikelheimer | D30/1 |
| D. 281,837 | 12/1985 | Lin | D3/284 |
| 1,421,964 | 7/1922 | Langford | 40/312 |
| 1,610,146 | 12/1926 | Panzer | 190/109 |
| 2,347,192 | 4/1944 | Grice | 190/19 |
| 2,484,661 | 10/1949 | Vogel | 40/725 |
| 2,628,694 | 2/1953 | Kushner | 190/109 |
| 3,487,814 | 1/1970 | Ingebritsen | |
| 3,890,932 | 6/1975 | Sanzone et al. | 119/498 |
| 3,941,092 | 3/1976 | Winters | 119/497 |
| 4,119,181 | 10/1978 | Jones | 190/107 |
| 4,171,683 | 10/1979 | Godin | 119/482 |
| 4,243,340 | 1/1981 | MacGregor | 190/109 X |
| 4,484,540 | 11/1984 | Yamamoto | 119/497 |
| 4,779,567 | 10/1988 | Smith | 119/165 |
| 5,134,974 | 8/1992 | Houser | 119/168 |
| 5,349,924 | 9/1994 | Hooper, Jr. | 119/496 |

*Primary Examiner*—Robert P. Swiatek
*Assistant Examiner*—Elizabeth Shaw
*Attorney, Agent, or Firm*—Aquilino & Welsh

[57] ABSTRACT

A carrying case for pet accessories. The carrying case includes a container having at least one compartment accommodating a variety of pet accessories. The container includes a closure for selectively opening and closing the container to permit access to the at least one compartment. The carrying case also includes a picture frame mounted on the outer surface of the container and an identifying picture of a pet housed within the picture frame.

15 Claims, 6 Drawing Sheets

5,755,180

CARRYING CASE FOR PET ACCESSORIES

BACKGROUND OF THE INVENTION

1. Field of the Invention

The invention relates to a carrying case for pet accessories. More specifically, the invention relates to a carrying case for pet accessories, wherein the carrying case includes a picture frame housing an identifying picture of a pet.

2. Description of the Prior Art

As anyone who has ever travelled with a pet understands, the day to day maintenance of a pet requires a wide variety of accessories. For example, it is often necessary for a pet owner to carry the pet's food, a food bowl, a hairbrush, medications, and other accessories designed for the well being of the pet.

As pet owners become more attached to their pets, pets have begun to travel with their owners more and more. Today's pets travel by plain, train and automobile. In addition, pets are boarded at kennels and veterinarian's facilities, and are dropped of for a day to play at doggy day care centers. When pets move in this manner, they must be accompanied by their toys, bones, balls, blankets, brushes, collars, leashes, sprays, medicines, foods, and vitamins.

This array of items is commonly contained in various unattractive shopping bags, boxes and small suitcases. When a pet owner packs the necessary accessories in a bag, box or small suitcase, he or she runs the risk of the accessories moving throughout the suitcase. In addition, it is often difficult for individuals unaccustomed to a specific pet's accessories to identify which bag, box or suitcase belonging to a specific pet. It is also common for pet owners to pick up the wrong bag, when many similar bags are lined up at the facility housing their pet.

With the shortcomings of prior bags, boxes and suitcases for pet accessories in mind, it is apparent that a need continues to exist for a carrying case suitable for transporting pet accessories in a convenient and compact manner. The present invention provides such a carrying case.

SUMMARY OF THE INVENTION

It is, therefore, an object of the present invention to provide a carrying case for pet accessories. The carrying case includes a container having at least one compartment accommodating a variety of pet accessories. The container includes a closure for selectively opening and closing the container to permit access to the at least one compartment. The carrying case also includes a picture frame mounted on the outer surface of the container and an identifying picture of a pet housed within the picture frame.

It is also an object of the present invention to provide a carrying case for pet accessories wherein the closure includes a latch for selectively locking when the container is closed.

It is a further object of the present invention to provide a carrying case for pet accessories wherein the container includes a plurality of compartments sized to accommodate a variety of pet accessories.

It is another object of the present invention to provide a carrying case for pet accessories including a closing flap for closing the at least one compartment.

It is also an object of the present invention to provide a carrying case for pet accessories wherein the picture frame is mounted on the closure of the container.

It is a further object of the present invention to provide a carrying case for pet accessories wherein the picture frame is mounted on a side wall of the container.

It is another object of the present invention to provide a carrying case for pet accessories wherein the picture frame includes a slot for removing the picture of a pet and inserting a second picture of a pet.

It is also an object of the present invention to provide a carrying case for pet accessories wherein the picture frame includes a transparent window protecting the picture of a pet.

It is a further object of the present invention to provide a carrying case for pet accessories including a second picture frame housing pet information.

It is another an object of the present invention to provide a carrying case for pet accessories including an instruction display releasably mounted within the container.

It is also an object of the present invention to provide a carrying case for pet accessories wherein the instruction display includes a plurality of display windows for supporting instructive information relevant to a pet.

It is a further object of the present invention to provide a carrying case for pet accessories wherein each of the display windows includes an opening permitting the replacement of the instructive information supported therein.

It is also an object of the present invention to provide a carrying case for pet accessories containing a litter box, kitty litter, or a water bowl.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limited, but merely as the basis for the claims and as a basis for teaching one skilled in the art how to make and/or use the invention.

Figure 1:
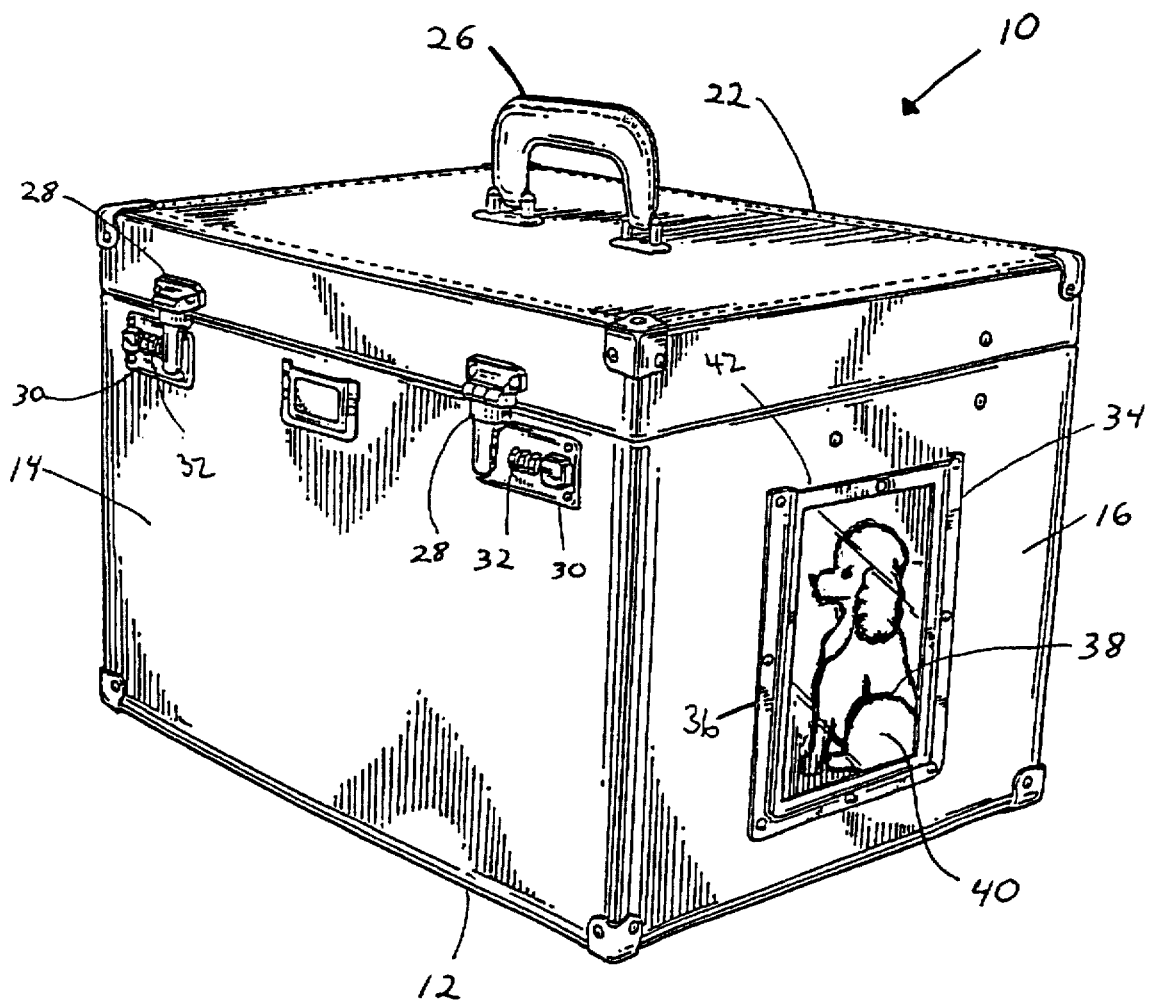
FIG. 1 is a perspective view of a first embodiment of the present invention.
Figure 2:
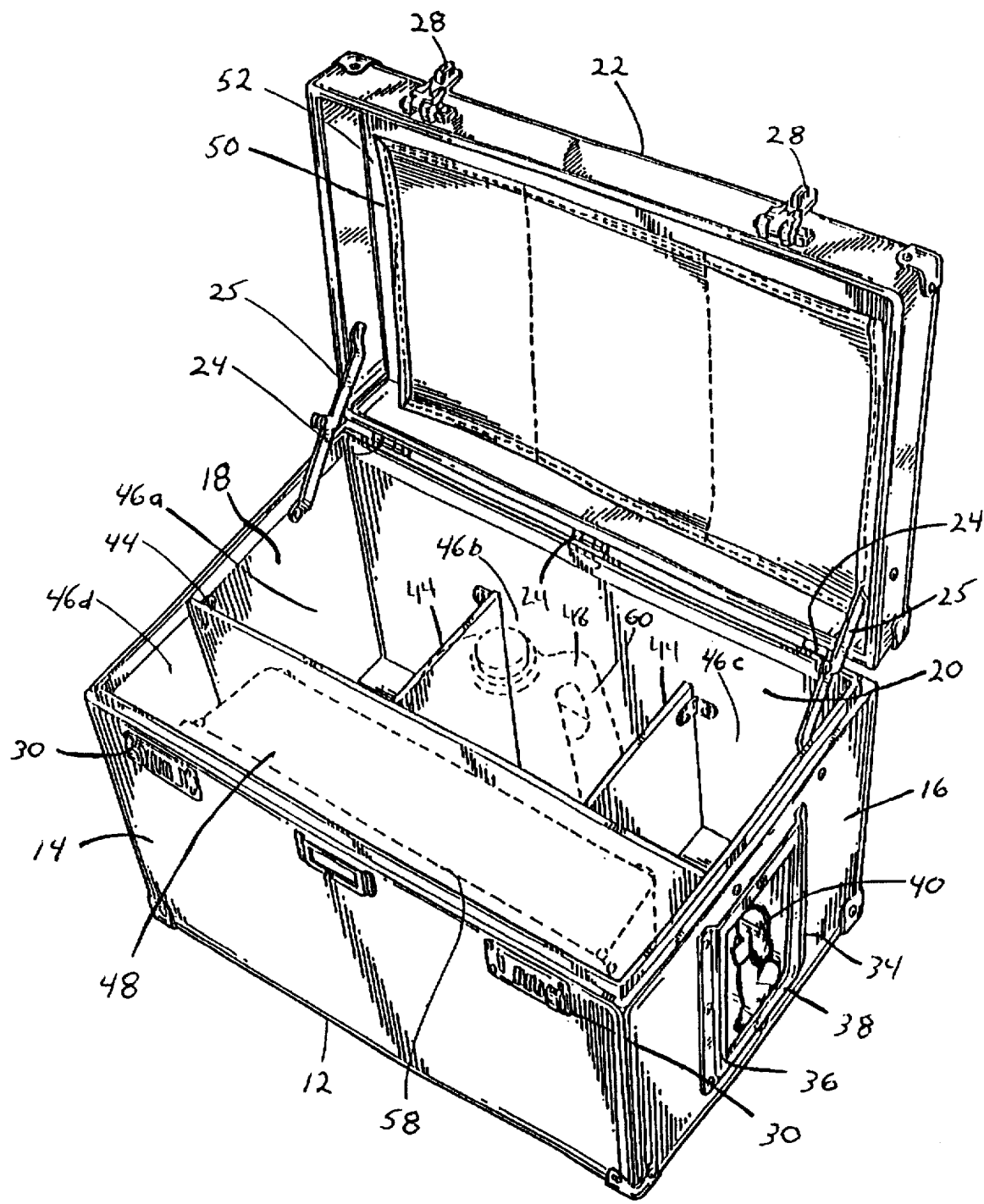
FIG. 2 is a perspective view of the carrying case showing the internal compartments of the case.
Figure 3:
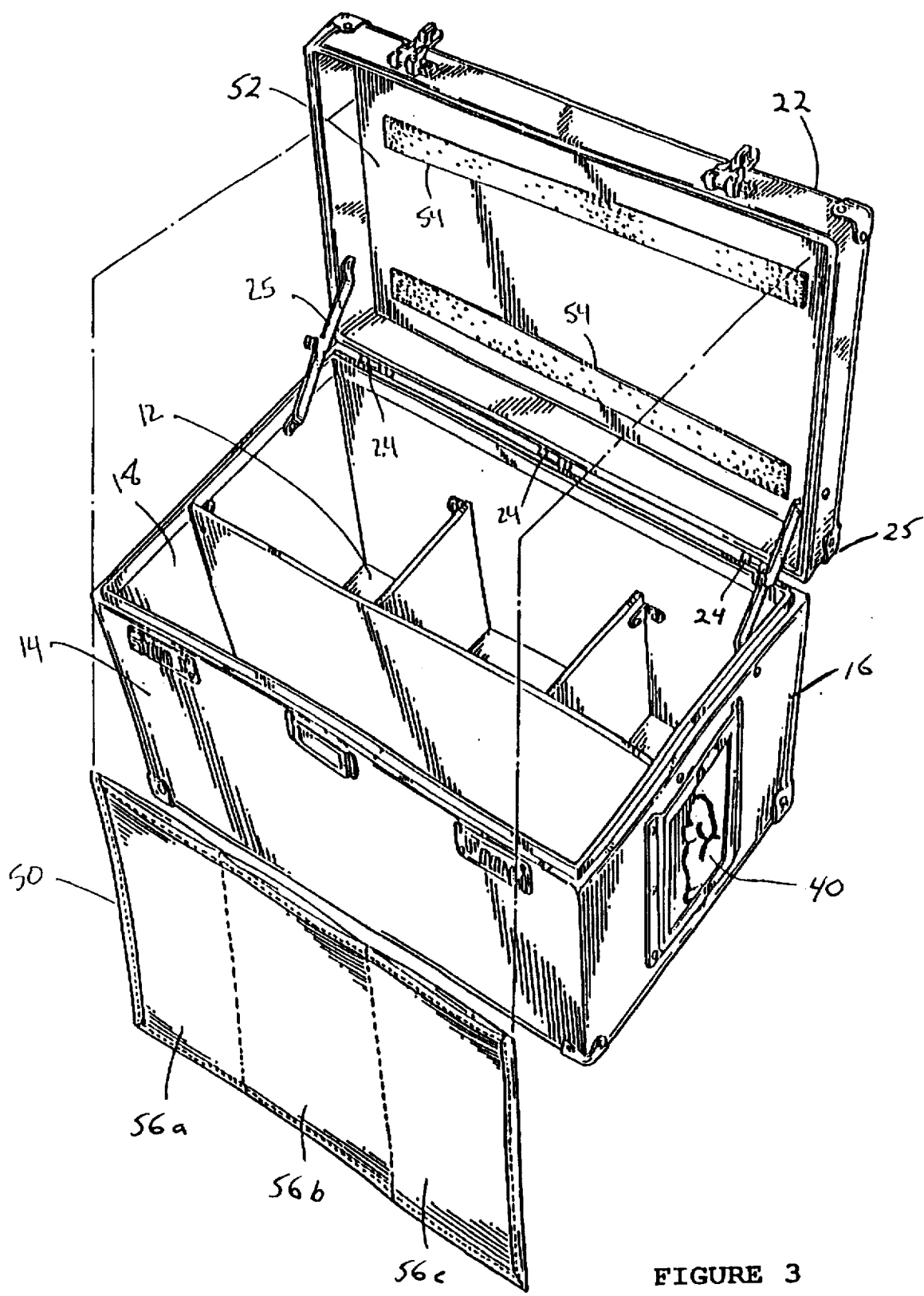
FIG. 3 is a perspective view of the open carrying case showing the instruction display removed from the inner surface of the carrying case.

With reference to FIGS. 1–3, a carrying case 10 for pet accessories is disclosed. The carrying case includes a base 12, a front wall 14, a first side wall 16, a second side wall 18, a back wall 20, and a closure 22 pivotally mounted across the top of the carrying case 10. The closure is secured to the back wall 20 by three hinges 24. A pair of hinged brackets 25 secured between the closure 22 and the side walls 16, 18 prevent the closure 22 from opening too far. The carrying case 10 is also provided with a handle 26 secured to the closure 22. The case is preferably constructed in a conventional manner and is sturdy enough to withstand the rigors of travel.

A pair of latches 28 are provided on the closure 22. The latches 28 rotate to engage locks 30 on the front wall 14 of the carrying case 10 to selectively secure the case 10 in a closed position when a user desires. The latches 28 and locks 30 are similar to those found on briefcases, and include a combination lock mechanism 32 permitting an individual to selectively lock the carrying case.

The carrying case 10 also includes a picture frame 34 coupled to the first side wall 16 of the carrying case 10. The picture frame 34 includes an outer frame member 36 coupled to the first side wall 16 of the carrying case 10 and a transparent window 38 mounted in the open space defined by the frame member 36. The transparent window 38 is preferably bonded to the frame member 36, although the window 38 could be attached in a variety of manners without departing from the spirit of the invention. The frame member 36 is preferably secured to the carrying case 10 by rivets, although other coupling structures could be used without departing from the spirit of the present invention. The frame member 36 may be made of metal, leather, or plastic, while the transparent window 38 is preferably a transparent plastic.

The picture frame 34 is designed to create a space between the first side wall 16 of the carrying case 10 and the transparent window 38 mounted on the frame member 36. The space is occupied by an identifying picture 40 of the owner's pet positioned within the frame member 36. The picture 40 permits the owner of the carrying case 10, or another individual caring for the pet, to easily identify the carrying case 10. The picture 40 also provides a pet owner with the opportunity to display the beauty of the pet to the rest of the world. The picture frame 34 includes a slot 42 at its upper end permitting the picture 40 of the pet to be removed and replaced with another picture of a second pet, if desired.

With reference to FIG. 2, the interior of the carrying case is disclosed. The carrying case 10 includes a plurality of partitions 44 mounted within the interior of the carrying case 10. The partitions 44 are designed to create a variety of compartments 46a, 46b, 46c, 46d. The compartments are preferably sized to receive and store the pet accessories 48 that must be carried by the pet owner. While the partitions in FIG. 2 are arranged to create three substantially square compartments 46a, 46b, 46c and one rectangular compartment 46d, other configurations could be provided, without departing from the spirit of the present invention.

The carrying case 10 is also provided with an instruction display 50 that may be releasably mounted on the inner surface 52 of the closure 22 (see FIG. 3). The instruction display 50 is provided with VELCRO, hook and loop material, which releasably engages VELCRO 54, hook and loop material, on the inner surface 52 of the closure 22. The instruction display may also be secured to the closure 22 by snaps or other connecting structures, without departing from the spirit of the present invention. The instruction display 50 includes a plurality of display windows 56a, 56b, 56c for supporting instructive information relevant to a pet. This information might include the pet's medical history, the pet's dietary information, or the pet's pedigree history.

The carrying case 10 shown in FIGS. 1–3 is specifically designed for cat supplies, although it may be used to carry dog, or other pet, supplies without departing from the spirit of the present invention. With this in mind, the carrying case may be provided with a litter box 58, a container filled with kitty litter 60, and other accessories.

Figure 4:
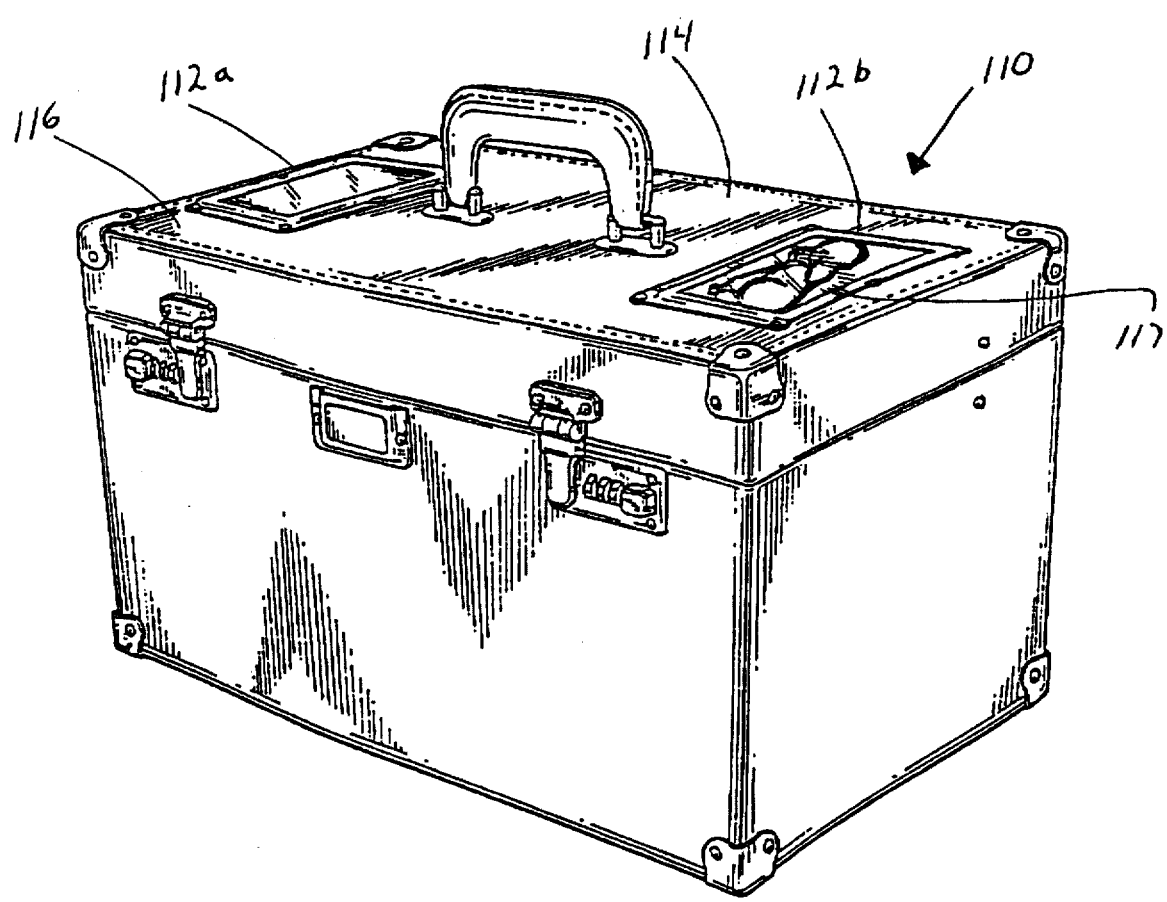
FIG. 4 is a perspective view of an alternate carrying case in accordance with the present invention.

An alternate embodiment of the present carrying case 110 is disclosed in FIG. 4. The carrying case disclosed in FIG. 4 is substantially similar to the carrying case disclosed in FIG. 1, with the exception of the interior compartment structure and the location of the picture frame.

Specifically, the carrying case 110 disclosed in FIG. 4 is provided with two picture frames 112a, 112b secured on the upper surface 114 of the closure 116. This arrangement permits a pet owner to place a picture 117 of his or her pet upon the carrying case. The second picture frame is for identification information including, but not limited to, the pet's name, the owner's name, address, and phone number, and an emergency phone number. This allows a pet owner to more easily identify the appropriate carrying case.

While the embodiments disclosed in FIGS. 1 and 4 show picture frames housing identifying pictures of pets at various locations on the carrying case, the picture frames may be positioned at other locations on the carrying case without departing from the spirit of the present invention. In addition, the number of picture frames on the carrying case may be varied without departing from the spirit of the present invention.

Figure 5:
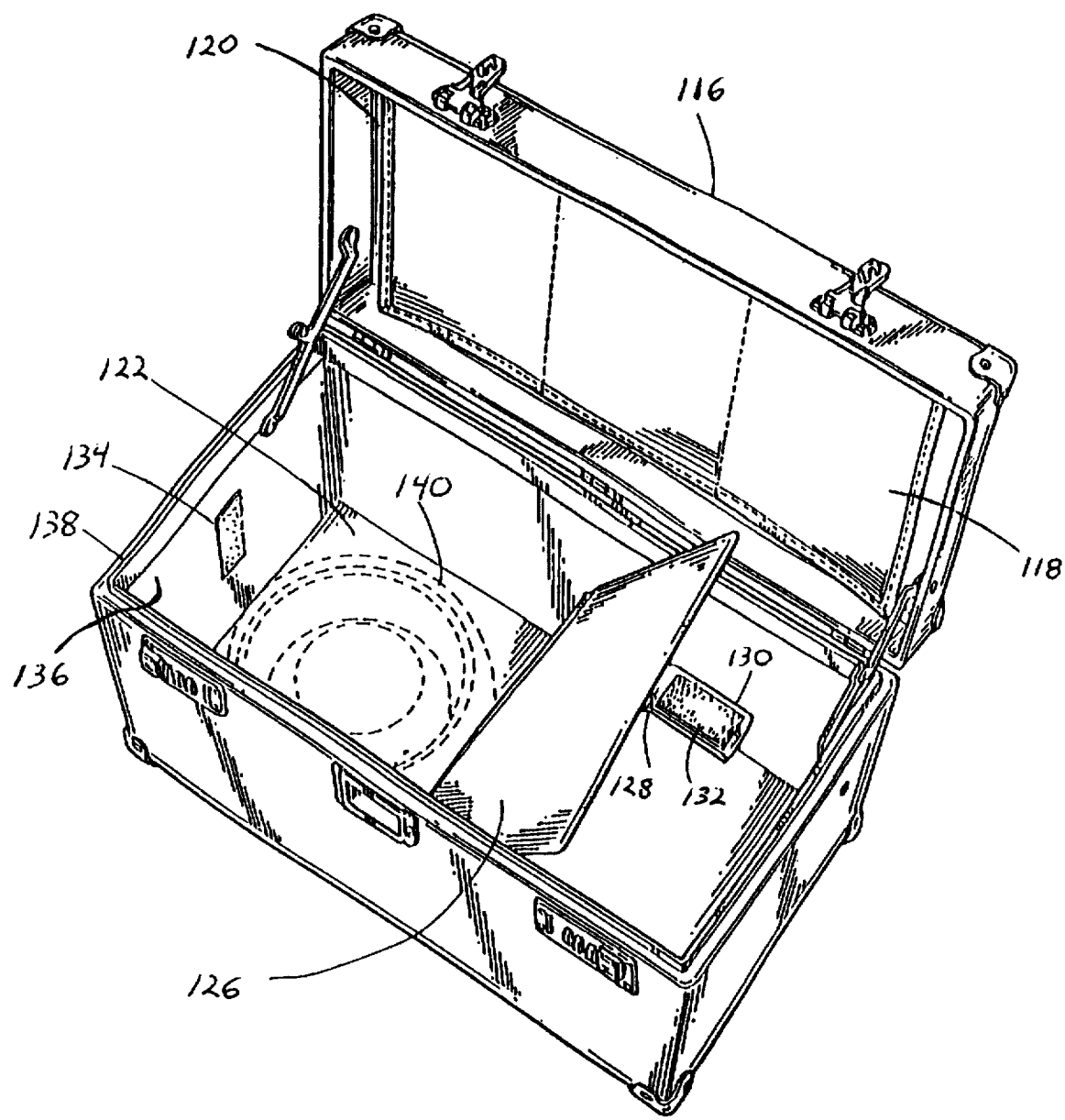
FIG. 5 is a perspective view showing the interior of the carrying case shown in FIG. 4.
Figure 6:
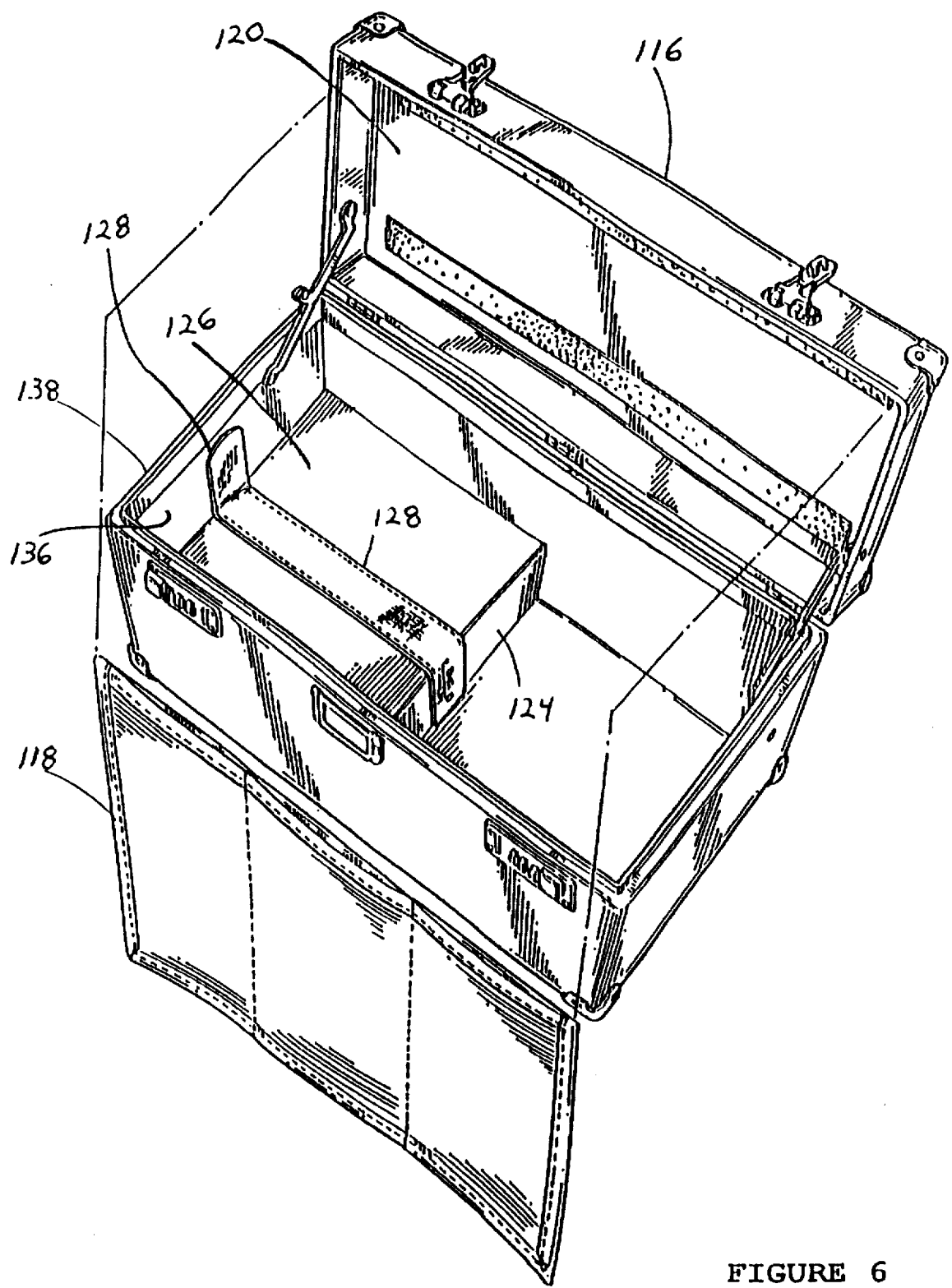
FIG. 6 is a perspective view of the interior of the carrying case shown in FIG. 4, with the instruction display detached and the storage compartment closed.

With reference to FIGS. 5 and 6, the interior of the carrying case disclosed in FIG. 4 is shown. As with the embodiment disclosed in FIG. 1, the carrying case includes an instruction display 118 releasably secured on the inner surface 120 of the closure 116. In addition, the carrying case 110 is provided with a closable compartment 122. The compartment 122 is defined by a first partition 124 mounted within the interior of the carrying case 110 and a closing flap 126 positioned over the compartment 122. The closing flap 126 is held in position by a strap 128 secured to both the partition 124 and the closing flap 126. The free end 130 of the strap 128 is provided with VELCRO 132, hook and loop material, positioned to engage VELCRO 134 on the inner surface 136 of the second side wall 138 of the carrying case 110 when the closure flap 126 is positioned to close the compartment 122 defined by the partition 124. As with the instruction display, the closing flap 126 may be secured to the side wall in a variety of well known manners, without departing from the spirit of the present invention.

The carrying case disclosed in FIGS. 4–6 is especially designed for dogs, and the compartment 122 is well suited for housing a dog bowl 140. It should, however, be understood that the carrying case could be used for a variety of pets without departing from the spirit of the present invention.

The present carrying case overcomes the shortcomings of the prior bags, boxes, and suitcases used by pet owners to carry their pet accessories. The present carrying case provides a plurality of compartments designed specifically to accommodate a variety of pet accessories in a manner preventing the accessories from moving within the case. As a result, pet owners are not confronted with damaged pet supplies or a bag filled with an array of disorganized pet accessories.

In addition, the identifying picture of the pet placed on the outer surface of the carrying case makes identification fast, easy and positive. Consequently, when a pet owner leaves his or her pet behind, the pet owner no longer has to worry that the pet's medications, food, and possessions will be tossed aside and not identified as belonging to the pet.

While the preferred embodiments have been shown and described, it will be understood that there is no intent to limit the invention by such disclosure, but rather, is intended to cover all modifications and alternate constructions falling within the spirit and scope of the invention as defined in the appended claims.

I claim:

1. A carrying case for pet accessories, comprising:

a container having at least one compartment accommodating a variety of pet accessories, the container including a closure for selectively opening and closing the container to permit access to the at least one compartment;

an instruction display releasably mounted within the container, the instruction display including a plurality of display windows for supporting instructive information relevant to a pet;

a picture frame mounted on the outer surface of the container; and an identifying picture of a pet housed within the picture frame.

2. The carrying case according to claim 1, wherein the closure includes a latch for selectively locking when the container is closed.

3. The carrying case according to claim 1, wherein the container includes a plurality of compartments sized to accommodate a variety of pet accessories.

4. The carrying case according to claim 3, wherein the plurality of compartments are defined by partitions.

5. The carrying case according to claim 3, further including a closing flap for closing at least one compartment.

6. The carrying case according to claim 5, further including a water bowl held within the at least one compartment.

7. The carrying case according to claim 3, further including a litter box held within a compartment.

8. The carrying case according to claim 3, further including a water bowl held within a compartment.

9. The carrying case according to claim 3, further including a container of kitty litter held within a compartment.

10. The carrying case according to claim 1, wherein the picture frame is mounted on the closure of the container.

11. The carrying case according to claim 1, wherein the picture frame is mounted on a side wall of the container.

12. The carrying case according to claim 1, wherein the picture frame includes a slot for removing the picture of a pet and inserting a second picture of a pet.

13. The carrying case according to claim 1, wherein the picture frame includes a transparent window protecting the picture of a pet.

14. The carrying case according to claim 1, further including a second picture frame housing pet information.

15. The carrying case according to claim 1, wherein each of the display windows includes an opening permitting the replacement of the instructive information supported therein.

* * * * *